United States Patent [19]

Kristensen

[11] Patent Number: 5,758,378

[45] Date of Patent: Jun. 2, 1998

[54] MACHINE FOR WASHING EGGS

[75] Inventor: Jens Kristian Sønderby Kristensen, Odense SØ, Denmark

[73] Assignee: Sanovo Engineering A/S, Odense NV, Denmark

[21] Appl. No.: 571,992

[22] PCT Filed: Jun. 10, 1994

[86] PCT No.: PCT/DK94/00229

§ 371 Date: Dec. 22, 1995

§ 102(e) Date: Dec. 22, 1995

[87] PCT Pub. No.: WO95/00012

PCT Pub. Date: Jan. 5, 1995

[30] Foreign Application Priority Data

Jun. 25, 1993 [DK] Denmark .................. 0756/93

[51] Int. Cl.[6] .................................. A01K 43/00
[52] U.S. Cl. .................. 15/3.14; 15/3.16; 15/77
[58] Field of Search .................... 15/3.14, 3.15, 15/3.1, 3.12, 3.13, 3.16, 88.1, 3.17, 3.18, 77, 21.2, 102

[56] References Cited

U.S. PATENT DOCUMENTS

| 901,774 | 10/1908 | Boies et al. ................ 15/3.12 |
| 2,442,475 | 6/1948 | Swanson ................... 15/3.13 |
| 2,880,432 | 4/1959 | Schnider et al. ............ 15/3.16 |
| 3,097,382 | 7/1963 | Angle ...................... 15/3.13 |
| 3,392,414 | 7/1968 | Cathcart ................... 15/3.13 |
| 3,909,290 | 9/1975 | Peppler et al. ............. 15/3.14 |
| 4,125,914 | 11/1978 | Warren ...................... 15/3.13 |
| 4,499,623 | 2/1985 | Kuhl ........................ 15/3.13 |
| 4,698,867 | 10/1987 | Kuhl ........................ 15/3.13 |
| 4,793,015 | 12/1988 | van der Schoot et al. ..... 15/3.13 |

FOREIGN PATENT DOCUMENTS

| 128973 | 8/1974 | Denmark . |
| 133883 | 8/1976 | Denmark . |
| 0328222 | 8/1989 | European Pat. Off. . |
| 164729 | 9/1980 | Netherlands ............. 15/3.17 |
| 745616 | 2/1956 | United Kingdom . |

*Primary Examiner*—Gary K. Graham
*Attorney, Agent, or Firm*—Sughrue, Mion, Zinn, Macpeak & Seas, PLLC

[57] ABSTRACT

A machine for washing eggs (1) has a washing section with spray nozzles (23) and with a brush frame (12) carrying brushes facing down towards the conveyor and having an underside profiled according to the egg shape. The brush frame is suspended in a stationary machine frame and may be actuated by a drive (30,38) for reciprocating movement in both the longitudinal and the transverse directions of the conveyor so that the brushes are moved in a curved movement in relation to the conveyor and thus also in relation to the eggs, which results in a thorough cleansing of, particularly, the end areas of the eggs.

19 Claims, 3 Drawing Sheets

U.S. Patent  Jun. 2, 1998  Sheet 1 of 3  5,758,378

MACHINE FOR WASHING EGGS

BACKGROUND OF THE INVENTION

The invention relates to a machine for washing eggs, the eggs being positioned in rows on a conveyor which may move the eggs in its longitudinal direction from a feeding section through a washing section to a delivery section, the washing section comprises spray nozzles for the discharge of washing water and a brush frame carrying brushes facing downwards towards the conveyor and having an underside profiled according to the egg shape, the frame itself is suspended in a stationary machine frame and may be actuated by a drive for reciprocating movement in the longitudinal direction of the conveyor.

The degree of cleaning of the eggs obtainable in the washing section depends on the design of the brushes and of the brush movements in relation to the eggs. In the known machines, it is usual to reciprocate the brush frame between two extreme positions which are substantially further spaced apart than the largest diameter of the eggs washed. British patent No. 745 616, for example, describes a machine wherein transverse rows of brushes are mounted on a common frame which is suspended in the machine frame via four identical linkages and is connected with a motor-driven eccentric disc through a horizontal linkage. By rotation of this disc, the brush frame is driven reciprocatingly in a movement which is arcuate in the vertical plane and rectilinear in the horizontal plane, and the distance between the extreme points of this movement is about four egg diameters. The rectilinear movement may be effected either in the longitudinal or the transverse direction of the conveyor. The brushes of the British patent all have the same length.

To prevent the brushes from breaking or piercing the eggshell, the underside of the brushes may be profiled according to the egg shape so that the brush bristles have a shorter length in the areas where the eggs are to pass than in the areas located between the eggs. In such a known machine, the brushes are reciprocated in the longitudinal direction of the conveyor so that they largely only act on the eggs with forces rotating the eggs about their longitudinal axes without any risk that the eggs are displaced in the transverse direction of the conveyor, which might cause a risk of harmful collisions of the eggs. The bristles at the ends of the eggs extend tangentially to the egg surface, and as the bristles easily bend in the transverse direction, their action on the egg at the end areas is very modest. Correspondingly, the cleansing effect is rather poor. In order to obtain an acceptable cleansing of the eggs it is necessary with relatively large brush movements in relation to the conveyor, which makes the eggs turn back and forth in relation thereto. The large relative movements between eggs and conveyor involve a certain risk of damage to the eggshells.

U.S. Pat. No. 3,097,382 describes a machine for washing eggs, wherein the brush frame is designed basically in the same manner as in the above British patent, but where the four linkages are fastened on a respective sprocket wheel rotated by the drive motor to make the frame as a unit execute a circular movement about an axis extending in the transverse direction of the conveyor. The cleansing movement of the brushes is also in this case arcuate in the vertical plane and rectilinear in the horizontal plane. However the movement is not reciprocatory, which results in the advantage, according to the US patent, that the brush movement does not transmit vibrations to the remainder of the structure of the machine.

U.S. Pat. No. 3,909,290 describes an egg washer with brushes mounted on associated pairs of transverse brush holders which are moved in pairs in mutually opposite transverse movements. The conjugate, mutually opposite movements contribute to limiting the resulting transverse forces on the eggs so that the risk of collision of eggs is reduced, but the design of the brushes with associated driving means is complex and thus costly. It is also necessary to incline the brushes at a relatively large angle to prevent damage to the eggs. The brushes in the US patent are not profiled in the transverse direction, which may restrict the cleansing of the ends of the egg.

It is a common feature in the known egg washing machines that the brushes are moved in a cleansing movement which is linear in the horizontal plane, which has the result that dirt adhering to the outer side of the egg is largely only affected by brush forces in one direction if the brush motion is rotatory, and in two opposite directions, if the brushes are moved in a reciprocating movement.

SUMMARY OF THE INVENTION

The object of the invention is to provide, by means of a machine of a simple design, a more efficient cleansing of the eggs than obtainable in the known machines.

This object is achieved in that simultaneously with the actuation of the frame for movement in the longitudinal direction, the drive also actuates the frame for reciprocating movement in the transverse direction of the conveyor so that in the horizontal plane, and thus in relation to the eggs, the brushes are moved in a curved movement produced by the combined longitudinal and transverse movement.

A curved brush movement in the horizontal plane should be understood to mean that the brush movement describes a curved path at least in this plane. Depending on the suspension of the brush frame, the brushes may additionally execute a known curved motion in the vertical plane, i.e. be moved up and down in relation to the plane of the conveyor, for example if the frame is linked to the machine frame and describes an upwardly and downwardly swinging motion when it is moved reciprocatingly.

As both the longitudinal and the transverse movements are rectilinear per se in the horizontal plane, the combined movement becomes curved in this plane. If the brush movements are viewed from a fixed point on the machine frame, the known rectilinear movements in the horizontal plane have the effect that the bristles are all moved to and from the fixed point at a permanent angle which coincides with either the longitudinal or the transverse direction of the conveyor. The curved brush movement provided by the invention forms a closed curve because the transverse and longitudinal movements are reciprocating, which means that the fixed point is all the time hit by a bristle from a new direction, and that largely all directions are covered during a single cycle of motion.

A spot of dirt on the outer side of the egg will thus be attacked by bristles from all directions along the egg surface, which efficiently loosens the dirt, also if it is located behind a local projection in the eggshell or behind a very adhesive thick piece of dirt. The brush movements result in a rapid removal of more loose dirt on all sides of an adhesive piece of dirt so that it is wetted by cleansing liquid from all sides and quickly loosened from the eggshell.

The transverse movement of the brush frame results in the long bristles projecting between two eggs being moved with a strong sliding motion along the end portions of the eggs so that they are also cleaned.

The rotating brush movement provided by the invention, which may have cyclically repeated runs or may exhibit a more random form of motion, results in such an efficient cleansing of the eggs that the amplitudes in the movements of the brush frame may be reduced, which diminishes the risk of unintended displacement of the eggs with consequent collision with neighbouring eggs. The amplitudes of the transverse and longitudinal reciprocating movements of the brush frame may, for example, be smaller than half the length and half the width, respectively, of the eggs. Preferably, the distance between the extreme points of the movements of the brush frame is not more than 30 mm in the longitudinal direction and not more than 30 mm in the transverse direction. This has turned out to provide a fully satisfactory cleansing of the eggs, also at their end portions, without any risk of the eggs colliding with a neighbouring egg.

There is a great difference in the dirtiness of an egg, for example depending on whether the eggs are from battery hens or from free range hens. With free range hens, the dirtiness depends on the weather and on the surroundings in which the eggs have been laid. The strength of the eggshell depends on, i. a., the feed state of the hens and on the age of the eggs, and thus great variations may occur in both the actions to which the eggs have to be exposed to obtain a sufficient cleansing, and the actions which the eggs are capable of tolerating without being damaged. Therefore, the drive may suitably be adjustable so that the amplitudes of the movements of the brush frame in the transverse direction and in the longitudinal direction are adjustable, preferably independently of each other, so that the brushes may be adjusted to a pattern of movement which is optimum in relation to removal of the type of dirt adhering to the eggs. Additionally, the drive is preferably adjustable so that the brush speed is variable, preferably infinitely variable. As a result the brushing intensity may be harmonized with the shell strength of the eggs to be washed. This renders possible an individual adaptation of the cleansing effect for large batches of uniform eggs and also for eggs of different sizes.

With a view to obtaining full freedom to adjust the pattern of movement of the brush frame, the drive in a preferred embodiment may comprise a first drive motor for the longitudinal motion and a second drive motor for the transverse motion, wherein the speeds of the motors are adjustable independently of each other.

In an embodiment of a particularly simple design, the reciprocating movements of the brush frame in the longitudinal and the transverse directions, respectively, are provided by a drive mechanism comprising a shaft rotatably journalled in the machine frame and having a central axis of rotation extending substantially at right angles to said movement, and having two radially extending flanges rigidly connected with the shaft, of which one flange is connected with an eccentrically journalled, motor-driven pin via a linkage, and the other flange is connected with a fixed point on the brush frame via a linkage.

The journalling of the shaft in the machine frame involves the advantage that the drive motor is relieved of a large part of the influences caused by the swinging brush frame.

The influences on the drive motor may be further reduced in that the linkage connecting the fixed point on the brush frame with the associated radially extending flange comprises at least one ball joint which absorbs the frame movements being at right angles to the frame movements caused by the action by the linkage on the frame. The ball joint also gives the frame greater possibility of executing freely sliding movements, which results in a more uniform force on the eggs.

The combined longitudinal and transverse movement of the brush frame may, after a long period of operation, lead to the brushes becoming bent, which reduces the cleansing effect. To counteract this, the frame may in an embodiment carry as least one brush section having a separate frame with two longitudinal carrier portions to which brushes are fastened, and two transverse guide rails which in a lengthwise displaceable manner may engage with the brush frame. The separate brush-carrying frame may regularly be withdrawn from the main frame, turned the other way and be inserted in the main frame again so that the brushes are affected in other directions, which counteracts their becoming bent. This further results in the advantage that inspection and cleaning of the machine is facilitated, because it is easy to remove the brushes from the machine.

BRIEF DESCRIPTION OF THE DRAWINGS

Examples of embodiments of the invention will now be described in further detail below with reference to the schematic drawing, in which.

DESCRIPTION OF THE PREFERRED EMBODIMENTS

Figure 1:
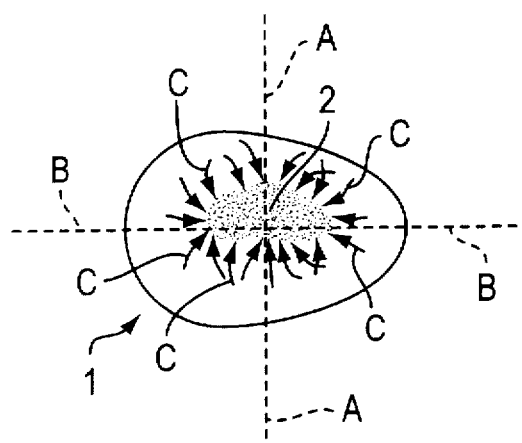
FIG. 1 illustrates an egg with a spot of dirt, wherein the directions of attack by the brushes on the spot are indicated by arrows.

FIG. 1 shows an egg 1 with a spot 2 of dirt. The arrows A illustrate the relatively large brush movements in a conventional washing machine with a profiled brush underside, where the brushes are reciprocated in the longitudinal direction of the conveyor, i.e., at right angles to the longitudinal axis of the egg. A corresponding, single-acting brush movement may also be provided by a known rotating brush having a rotational axis in the transverse direction and radially extending bristles. The arrows B indicate the brush movements of the above US patent. The many short arrows C illustrate the intensive brush actions from many different directions and with rather small amplitudes in the brush movements provided by the invention. These curved brush movements attack the spot 2 of dirt from all sides and at many different angles so that the dirt is also removed from the areas of the eggshell where jumps in level occur. A curved brush movement is to be understood to be a movement which is not rectilinear, for example, a circular or elliptical movement if the longitudinal and transverse movements have the same frequency, or a more complex loop-like curved movement if the frequencies differ.

Figure 2:
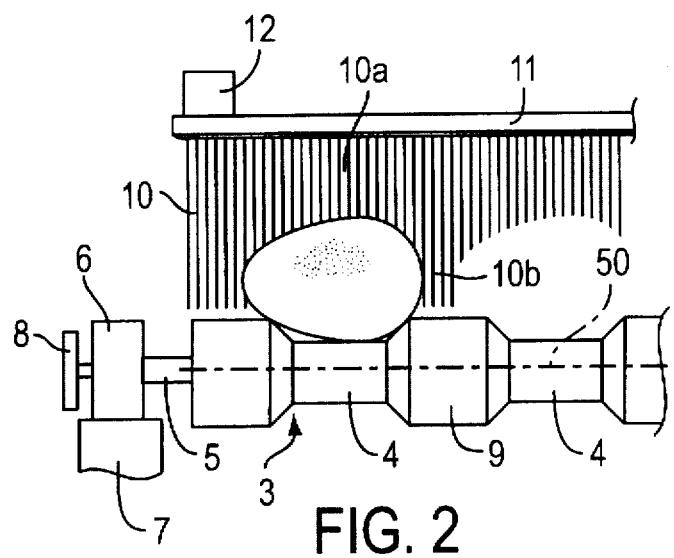
FIG. 2 shows a washing roller and a brush with intermediate eggs.

A conveyor roller 3 shown in FIG. 2 has a section 4 with a reduced diameter and is rigidly mounted on a shaft 5 which, via a supporting wheel 6 also rigidly mounted on the shaft, bears on a support 7 rigidly mounted in the machine frame. The conveyor comprises many conveyor rollers 3, which are positioned in parallel and have longitudinal axes arranged in the horizontal plane 50, and are interconnected through a driving chain 8, which pulls the rollers along the support 7. The contact of the wheel 6 on the support 7 makes the conveyor roller 3 rotate, while the upper run of the conveyor is moved longitudinally along the support 7.

Instead of a supporting wheel 6, the extreme portion of the conveyor roller 3 itself may bear on the support 7 and produce the rotation of the roller.

The eggs are fed onto the conveyor between two adjacent conveyor rollers in alignment with section 4 so that the sections 9 having a larger diameter and being located between several sections 4 restrict the possibility of the egg for displacement in the longitudinal direction of the roller. As seen from FIGS. 3 and 4, the eggs are thus positioned in transverse rows between each pair of adjacent conveyor rollers and in longitudinal rows in alignment with sections 4.

As seen from FIGS. 2–5, the bristles 10 are mounted in transverse brush holders 11 fastened to the bottom side of a brush frame 12. The brush holder 11 may be a cross-sectionally U-shaped strip where the bristles are inserted into the U, whereupon the strip is squeezed together about the bristles and fastens their upper ends. The U-shaped strip may also have a longitudinal, inwardly directed flange at the outer end of each of the branches of the U, so that there is a narrow passage between the opposite flanges through which the bristles may project. In that case, the bristles may have a thickened upper section which is inserted into the U above the inwardly directed flanges.

Figure 5:
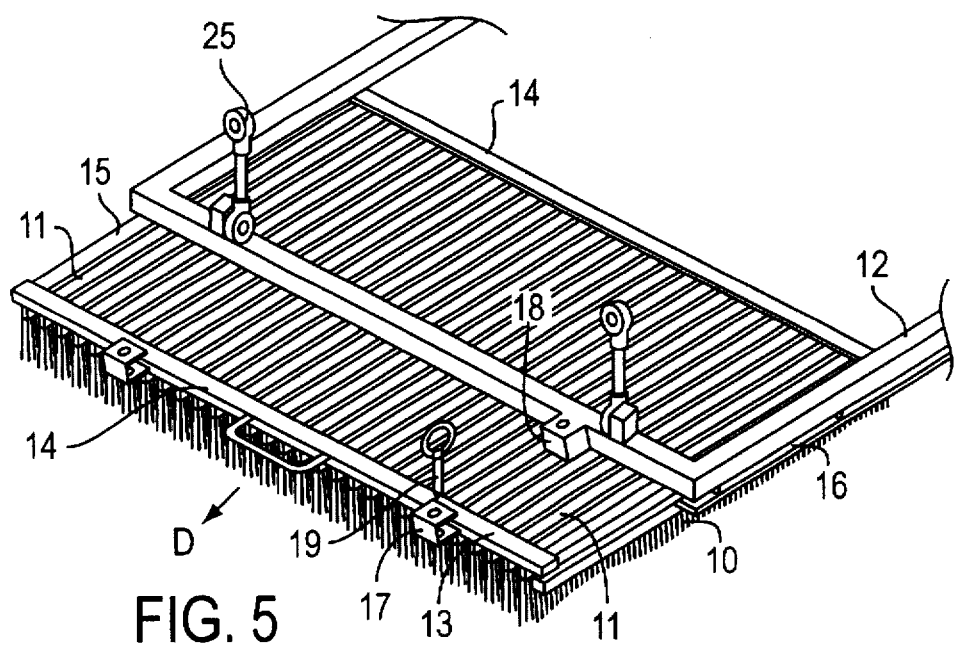
FIG. 5 is a segment of a brush section for a brush

As illustrated in FIG. 2, the brush holders 11 may be fastened directly on the bottom side of the frame 12, for example by means of welding, but as shown in FIG. 5, they may also be mounted in sections on a separate frame 13, which has two parallel longitudinal carrier portions 14 to which the brush holders 11 are welded, and two parallel transverse guide rails 15, each having an engagement opening facing to the side which may, in a lengthwise displaceable manner, engage with a retaining strip 16 fastened to the brush frame 12 at a short distance from bottom side thereof. Two cooperating locking means 17, 18 mounted on the frame 13 and the brush frame 12, respectively, may fix the two frames in relation to each other. In the case shown, the locking means are designed as a projecting pin 18 with a vertical through bore and an angled flange 17 which may be inserted over the pin 18 and has two holes which, in the mounted condition of the frame 13, are in alignment with the through bore in the pin 18, so that a locking pin 19 may be inserted through the cooperating holes. The locking means may also consist in a security bolt inserted of a threaded bore in one frame, which bolt may be screwed tightly against the other frame. This mounting of the brushes permits a very rapid and simple replacement of a whole brush section, by pulling the frame 13 out in the direction of the arrow D, whereupon a new brush section may be inserted on the brush frame 12.

Vertically above the longitudinal rows of eggs, the bristles 10a have a shorter length so that the bristles do not brush too hard against the upper side of the eggs. Between the longitudinal rows of eggs, the bristles 10b are of full length to enable them to act on the end portions of the eggs.

In the drawing, for the sake of clarity, the machine frame is only indicated in segments to the extent required for understanding the invention. The frame is of a conventional frame-shaped structure and is provided with screen plates along the conveyor. At one end of the conveyor is a feeding section, not shown, where the eggs are lifted from egg trays in a conventional manner to the upper run of the conveyor, for example by means of suction cups. At the other end of the conveyor, the eggs are transferred via a conventionally designed delivery section, also not shown, to an egg processing machine, such as an egg breaking machine, a grader, or a packer.

The conveyor 20 moves the eggs in through a washing section generally designated 21, where a water distributing pipe 22 with spray nozzles 23 sprays the eggs with water. The brush frame 12 positioned at a lower level than the spray nozzles is pivotally suspended in the machine frame 24 by means of yoke straps or linkages 25. The lower ends are rotatably journalled on projecting flaps 26 on the carrying frame, and the upper ends of which are rotatably journalled on a radially extending flange 27 which, at a distance from the journalling point, is fixedly mounted to a shaft 28. The shaft is supported by the machine frame and is fixable by means of a handle 29 and a fixation bolt, not shown, in different angular positions with simultaneous adjustment of the brush frame 12 in different heights above the conveyor. By adjustment of the two handles 29, the brush frame 12 may thus be adjusted for eggs or different sizes, just as the pressure of the brushes against the eggs may be varied. The transverse brush frame movement is provided in the first embodiment of the invention shown in FIG. 1 by an electric drive motor with an infinitely variable speed. The motor drives a disc having an eccentrically positioned pin 31 to which the upper end of a driving rod 32 is rotatably journalled. The lower end of the driving rod is rotatably journalled on a pin 33 at the outer end of a flange 34. The flange is fastened in a radially extending manner on a longitudinal second shaft 35, which is rotatably journalled in the machine frame and has two radially downwardly extending flanges 36 in alignment with the transverse side portions in the brush frame 12. The flanges are rotatably journalled through respective linkages 37 to projecting pins on the brush frame 12. The linkage 37 is journalled in ball joints on both the flange 36 and the pin on the frame so that the frame may execute both rotatory and longitudinal movements in relation to the flange 36. When the motor 30 drives the driving rod 32 up and down, the second shaft 35 is swung back and forth, which makes the flange 36 execute a swinging movement which is transmitted through the linkage 37 to the brush frame 12 as a transversely reciprocating movement indicated by arrows E.

In a completely corresponding manner, the longitudinally reciprocating movement indicated by arrows r is produced by a second drive motor 38 with an eccentrically driven driving rod 39 which is in driving connection with a projecting pin on the brush frame 12 through a transverse third shaft 40 journalled in the machine frame and having associated radially extending flanges 41, 42 and a linkage 43, so that the brush frame 12 is reciprocated when the infinitely variable motor 38 is rotating. The linkage 43 is journalled in a rotatable and transversely displaceable manner by means of ball joints on the arm 42 and the brush frame, respectively.

The longitudinal movement indicated by arrows F, and the transverse movement indicated by arrows E make the brushes move in a combined curved movement in the plane defined by the longitudinal and transverse directions. This will normally be the horizontal plane, as the conveyor usually has a horizontal upper run. Alternatively, the conveyor in the washing section may be inclined in the transverse and/or the longitudinal direction, and in this case it is obvious that the curved movement provided by the invention is executed with a corresponding inclination.

The machine may comprise one or more brush frames. If there are several brush frames, the second shaft 35 may be through-going and drive all the frames, while the frames in the longitudinal direction may be coupled by means of linkages so that a single shaft 40 may drive all the frames in a reciprocating manner.

Figure 3:
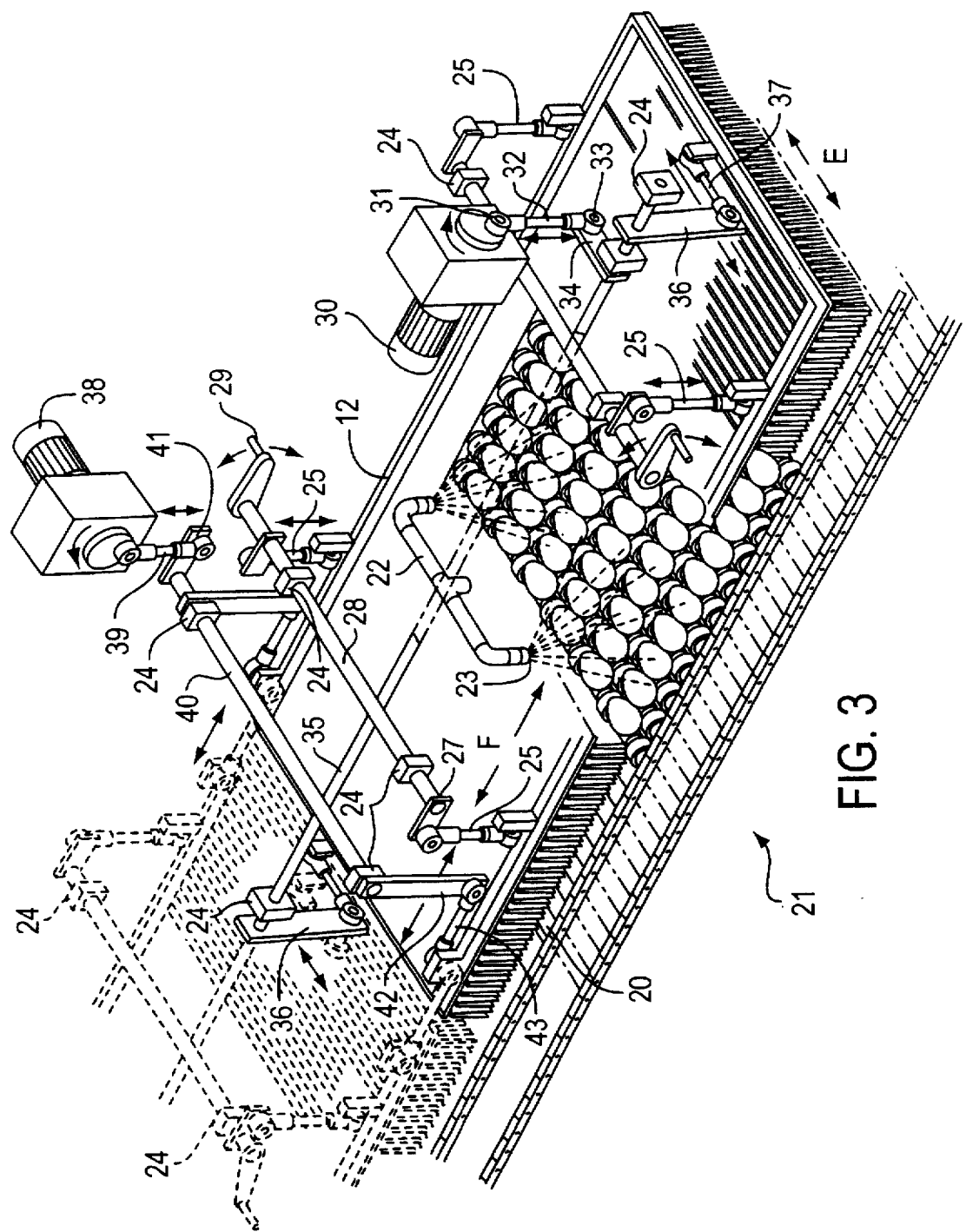
FIG. 3 is a perspective view of a first embodiment of a machine according to the invention.
Figure 4:
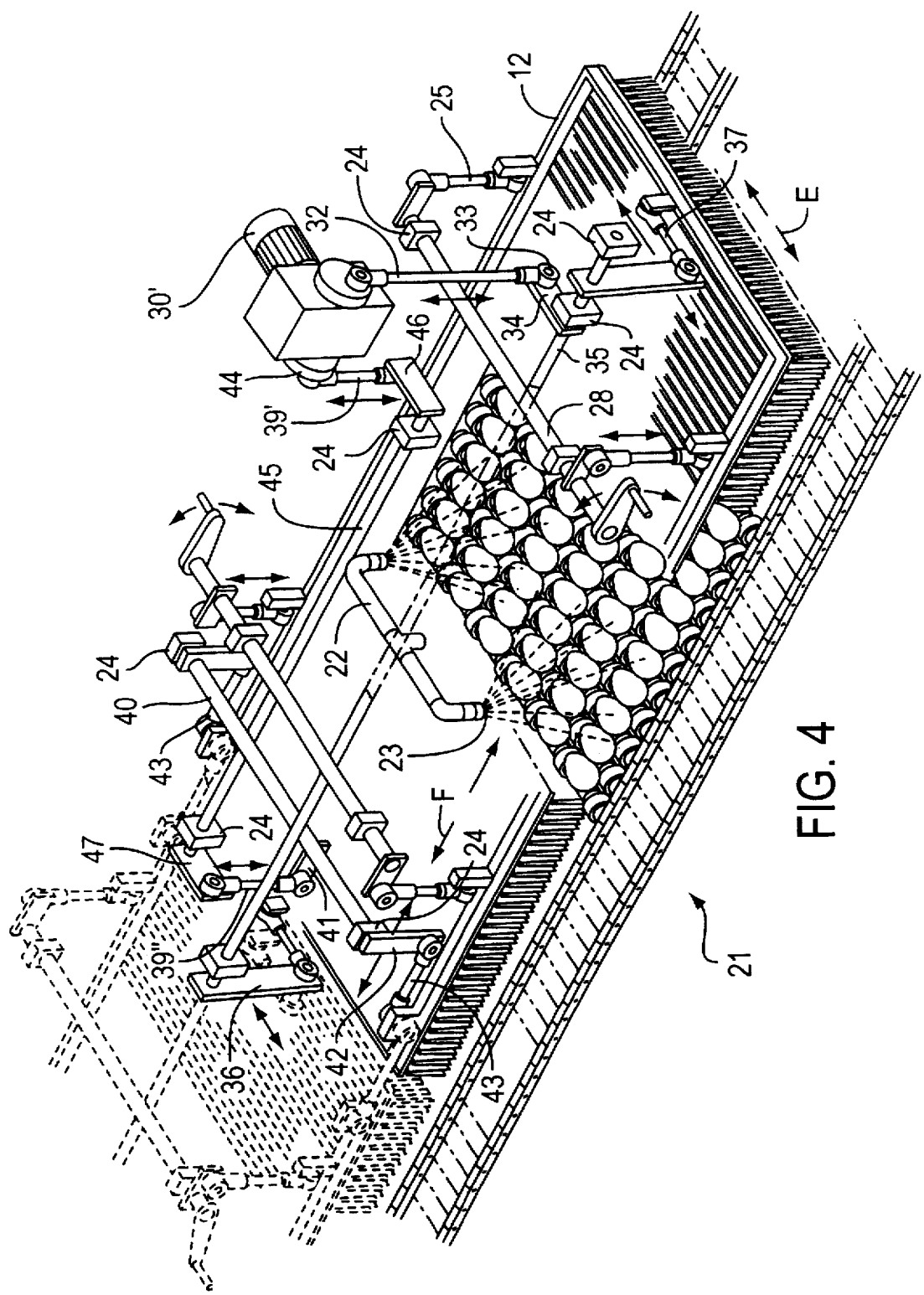
FIG. 4 is a perspective view of a second embodiment of the machine according to the invention.

The second embodiment shown in FIG. 4 deviates from the embodiment of FIG. 3 by having only one drive motor 30', which, in addition to the driving rod 32, also drives a driving rod 39' eccentrically journalled on a second disc 44, which driving rod 39' actuates the driving rod 39" through a third shaft 45 journalled in the machine frame and having two radially extending flanges 46 and 47, in the same manner as the driving rod 39 in FIG. 3 is actuated by the motor 38. It is advantageous that only a single drive motor has to be used.

I claim:

1. A machine for washing eggs, said machine comprising a feeding section, a washing section and a delivery section, an elongated conveyor movably mounted in a stationary machine frame and supporting eggs in rows thereon, said conveyor defining a longitudinal direction, the eggs being moved by said conveyor from said feeding section through said washing section to said delivery section, said washing section comprising spray nozzles (23) for discharging washing water and a brush frame (12) carrying brushes facing downwards towards the conveyor and having an underside profiled according to an egg shape, said brush frame suspended in the stationary machine frame (24) and actuated by a drive (30, 38) for reciprocating movement in said longitudinal direction of the conveyor, wherein simultaneously with actuation of the brush frame (12) for movement (F) in the longitudinal direction, said drive (30, 38) also actuates said brush frame for reciprocating movement (E) in a transverse direction of the conveyor in a plane parallel to a plane defined by said conveyor, and thus also in relation to the eggs, said brushes being moved in a curved movement produced by combined longitudinal and transverse movement of said brush frame.

2. A machine according to claim 1, wherein amplitudes of transverse and longitudinal reciprocating movements of the brush frame (12) are smaller than half a length and half a width, respectively, of the eggs.

3. A machine according to claim 2, characterized in that the distance between extreme points of movements of the brush frame (12) is not more than 30 mm in the longitudinal direction and not more than 30 mm in the transverse direction.

4. A machine according to claim 2, characterized in that the drive (30, 38) is adjustable so that amplitudes of the movements of the brush frame (12) in the transverse direction and in the longitudinal direction are adjustable, preferably independently of each other.

5. A machine according to claim 2, characterized in that the drive (30,38) is adjustable in such a manner that brush speed is variable.

6. A machine according to claim 2, characterized in that the drive comprises a first drive motor (38) for the longitudinal movement of said brush frame and a second drive motor (3) for the transverse movement of said brush frame, and speeds of the motors are adjustable independently of each other.

7. A machine according to claim 1, characterized in that distance between the extreme points of movements of the brush frame (12) is not more than 30 mm in the longitudinal direction and not more than 30 mm in the transverse direction.

8. A machine according to claim 7, characterized in that the drive (30, 38) is adjustable so that amplitudes of the movements of the brush frame (12) in the transverse direction and in the longitudinal direction are adjustable, preferably independently of each other.

9. A machine according to claim 7, characterized in that the drive (30,38) is adjustable in such a manner that brush speed is variable.

10. A machine according to claim 7, characterized in that the drive comprises a first drive motor (38) for the longitudinal movement of said brush frame and a second drive motor (3) for the transverse movement of said brush frame, and speeds of the motors are adjustable independently of each other.

11. A machine according to claim 1, characterized in that the drive (30, 38) is adjustable so that amplitudes of the movements of the brush frame (12) in the transverse direction and in the longitudinal direction are adjustable, preferably independently of each other.

12. A machine according to claim 11, characterized in that the drive (30,38) is adjustable in such a manner that brush speed is variable.

13. A machine according to claim 11, characterized in that the drive comprises a first drive motor (38) for the longitudinal movement of said brush frame and a second drive motor (3) for the transverse movement of said brush frame, and speeds of the motors are adjustable independently of each other.

14. A machine according to claim 1, characterized in that the drive (30, 38) is adjustable in such a manner that brush speed is variable.

15. A machine according to claim 14, characterized in that the drive comprises a first drive motor (38) for the longitudinal movement of said brush frame and a second drive motor (3) for the transverse movement of said brush frame, and speeds of the motors are adjustable independently of each other.

16. A machine according to claim 1, characterized in that the drive comprises a first drive motor (38) for the longitudinal movement of said brush frame and a second drive motor (30) for the transverse movement of said brush frame, and speeds of the motors are adjustable independently of each other.

17. A machine according to claim 1, characterized in that the reciprocating movements of the brush frame (12) in the longitudinal direction and the transverse direction, respectively, are produced by a drive mechanism comprising a shaft (35, 40) rotatably journalled in the machine frame and having a central axis of rotation extending substantially at right angles to said movement, two radially extending flanges (34, 36, 41, 42) rigidly connected with the shaft, of which one flange (34, 41) is connected with an eccentrically journalled motor-driven pin via a linkage (32, 39), and the other flange (36, 42) is connected with a fixed point on the brush frame (12) via a linkage (37, 43).

18. A machine according to claim 17, characterized in that the linkage (37, 43) connecting the fixed point on the brush frame (12) with the associated radially extending flange (36, 42) comprises at least one ball joint.

19. A machine according to claim 1, characterized in that the frame (12) carries at least one brush section having a separate frame (13) with two longitudinal carrier portions (14) to which brushes are fastened, and two transverse guide rails (15) which may engage with the brush frame (12) in a lengthwise displaceable manner.

* * * * *